Patented Jan. 5, 1932

1,839,408

UNITED STATES PATENT OFFICE

RICHARD E. MIESSE, OF CHICAGO, ILLINOIS, ASSIGNOR, BY MESNE ASSIGNMENTS, TO Q. R. S.-NEON, INC., OF CHICAGO, ILLINOIS, A CORPORATION OF ILLINOIS

POSITIVE COLUMN CONDUCTION TUBE

No Drawing.   Application filed October 13, 1928. Serial No. 312,300.

My invention relates to gaseous discharge devices and a method of making the same, and has for its object the provision of devices of this kind in which the efficiency of operation is increased.

My invention in its preferred form is more particularly applicable to that type of gaseous conduction device which utilizes the luminous effect of the positive column.

In accordance with my invention I provide an electrode or electrodes for the device by virtue of which this increase in efficiency is affected.

My invention is applicable to those forms of gaseous conduction device in which a gas is utilized which may be rendered luminous upon the impression of a difference of potential between electrodes immersed in the gas. In order to provide the electrode, I utilize a metal or metals or their alloys which have a melting point that should be at or above 1000° C. and this metal or metals constitute the core of the electrode. The electrode may be filamentary or may have any other suitable design. This metal core is then provided with a suitable activating agent to which I add another agent whereby my improved results are brought about. The activating agent may be barium, strontium and calcium oxides or their equivalents.

The electrode as thus formed is then chosen to be of such a size that it may operate at incandescence due to positive ion bombardment. When the electrode is thus operated so as to become incandescent through the positive ion bombardment, the ionizing effect of the emanated electrons assists in increasing the conductivity of the gas which is to be rendered luminous. This gas may be neon, helium or any other suitable gas which becomes luminous upon ionization. Due to the ionizing effect of the incandescent cathode, the device may be operated at a much lower voltage than is necessary for the effective operation of the device with a cold cathode.

I will describe a specific form of electrode which I have found capable of bringing about the desired result above specified.

To provide this form, I made a mixture of calcium, strontium and barium oxides. I added silver oxide although my experiments indicated that other metals such as platinum and gold would serve the purpose. This mixture of alkaline earth oxide and silver oxide was mixed with water to form a paste which was painted on the metal core of the electrode. The coated electrode was then heated in air to about 1000° C. to thereby get a close bonding between the coating and the electrode. Thereafter I mount this electrode in a vacuous tube and subject the gas within the tube to a discharge, the pressure of the gas in the tube being about 1/10 mm. to 1/100 mm. At this low pressure I find that the positive ion bombardment raised the electrodes to incandescence. Gradually a small amount of silver seemed to appear and grow on the walls of the tube and this discharge continued for about ten or fifteen minutes until no more silver was deposited. At this point I stop the discharge and completely evacuate the tube. Thereupon, I admit a gas, such as neon, to a satisfactory pressure such as from 7 to 15 mms. The tube was then tipped off and was ready for operation.

I find that a tube prepared in this way brought about a greater electron emission. I have found that merely coating the tube with silver would fail of the result heretofore outlined as obtainable from the tube constructed with my new method. I have found that the tube constructed in accordance with this invention operated more efficiently than other gaseous conduction tubes not constructed in accordance with the principles herein set forth.

I do not wish to limit myself to the particular materials employed as there are others which can serve the same purpose and which therefore are the equivalents of those herein outlined. The description given herein, however, indicate the nature of the phenomena in their broad aspect.

Having thus described one specific form which my invention may take, what I claim as new and desire to secure by Letters Patent is:

1. The method of forming a gaseous conduction tube which consists in preparing an electrode core of metal of high melting point, coating said electrode with a coating including an activating substance and a metallic substance or a salt thereof, inserting said electrode in said tube, evacuating said tube to a degree of high rarefaction and then subjecting said tube to a gaseous discharge thereby depositing said metallic substance upon the inner wall of said tube.

2. The method of forming a gaseous conduction tube which consists in preparing an electrode core of metal of high melting point, coating said electrode with a coating including an alkaline earth metal containing substance and a metallic substance or a salt thereof, inserting said electrode in said tube, evacuating said tube to a degree of high rarefaction and then subjecting said tube to a gaseous discharge thereby depositing said metallic substance upon the inner wall of said tube, said electrode during said discharge becoming incandescent due to positive ion bombardment.

3. The method of forming a gaseous conduction tube which consists in preparing an electrode core of metal of high melting point, coating said electrode with a coating including an alkaline earth metal containing substance and a metallic substance of the noble metal group or a salt thereof, inserting said electrode in said tube, evacuating said tube to a degree of high rarefaction, then subjecting said tube to a gaseous discharge thereby depositing said metallic substance upon the inner wall of said tube, said electrode during said discharge becoming incandescent due to positive ion bombardment, then completely evacuating said tube and thereafter introducing a gas therein adapted upon ionization to become luminous.

In witness whereof, I hereunto subscribe my name this 2nd day of October, A. D., 1928.

RICHARD E. MIESSE.